July 16, 1946.  B. F. CASTLE  2,404,039
OIL BURNER
Filed July 13, 1944

Inventor:
Boyd F. Castle
By: Sheridan, Davis & Cargill
Attys.

Patented July 16, 1946

2,404,039

UNITED STATES PATENT OFFICE 2,404,039

OIL BURNER

Boyd F. Castle, Quincy, Ill., assignor to The Quincy Stove Manufacturing Company, Quincy, Ill., a corporation of Illinois Application July 13, 1944, Serial No. 544,656

6 Claims. (Cl. 158—91)

This invention relates to improvements in oil burners and has for an object the provision of means to compact the pilot fire and to effect a reduction in the oil consumption during pilot fire. These and other objects will be more fully set forth and made apparent in the following description and in the accompanying drawing.

Figure 1:
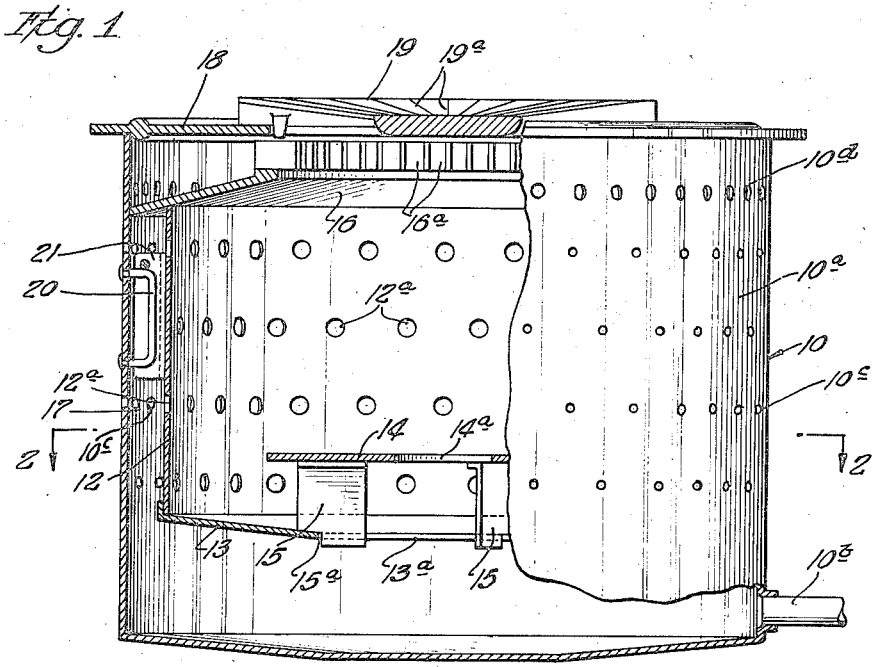
Figure 2:
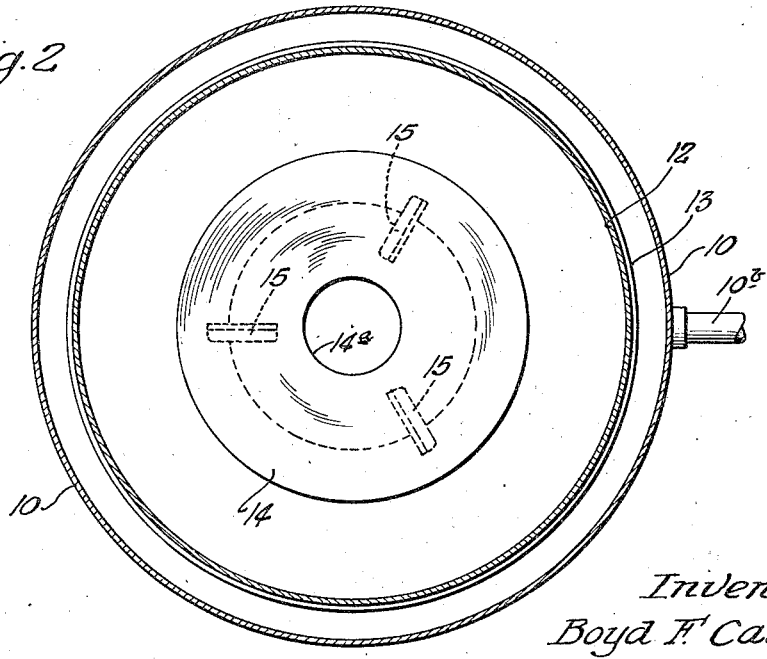

I have illustrated a specific embodiment of my invention in the drawing, in which Figure 1 is a broken elevation of a burner illustrative of the invention, parts of the burner being shown in section; and Fig. 2 is a sectional view taken on line 2—2 of Fig. 1.

Like numerals refer to like elements in the drawing, in which 10 designates an open top pot for a vaporizing type burner, said pot having the side wall 10a with what are termed for convenience, primary air holes 10c arranged in horizontal rows and a row of secondary air holes 10d above said primary holes and near the top of the burner. An inlet 10b is provided for supply of fuel oil to the bottom of the pot from any suitable source of supply, preferably under control to meet the demands for heat.

Located within the pot and coaxial with the side wall thereof, in the form illustrated, is the shell 12 having air holes 12a each in alignment with a corresponding hole 10C in the pot side wall 10a. Preferably, the holes 12a are larger in diameter than the holes 10c. Extending inwardly and downwardly from the bottom of the shell 12 is the gas ring 13 which is centrally apertured at 13a and spaced from the bottom of the pot 10. What I term a pilot ring is located as indicated at 14 above and spaced from the gas ring over the aperture 13a. The pilot ring is provided with downwardly extending legs 15 flanged at the top for attachment, as by welding or the like, to the gas ring. The legs 15 are notched at 15a to permit their partial insertion into the aperture 13a whereby they serve to position as well as support the pilot ring in operative relation to the gas ring. The pilot ring 14 is provided with the central aperture 14a which permits ready ignition of the oil in the pot if the burner has been out of operation.

Mounted upon the shell 12 and inclined upwardly and inwardly from the pot side wall is a so-called turbulator ring 16 forming per se no part of this invention. This ring is centrally apertured and provided with ribs 16a which direct air currents from the secondary air holes 10d into gases rising from the pot. This ring also serves to close the top of the mixing chamber 17 formed by the pot side wall and the shell 12.

Located above the turbulator ring and mounted upon the top of the pot is a centrally apertured plate 18 and over the aperture thereof is a rotor plate 19 which is provided with the vanes 19a to impart rotation to flames issuing from the pot at high fire.

The shell 12 may be supported removably within the pot 10 by a plurality of loops 20 secured to the inside of the pot which cooperate with channel members 21 secured to the exterior of the shell, one of such supporting means only being shown in Fig. 1.

In operation, when only enough oil is supplied through inlet 10b to maintain a pilot flame or fire, combustion is confined to a zone above the gas ring and mainly beneath the level of the pilot ring, the latter apparently serving to confine the gases and compact the pilot fire. When oil is supplied in sufficient quantity to maintain a higher fire, the flames are increased in volume and jets of flame project from the holes 12a to a height determined by the amount of oil being supplied. At high fire, secondary air flows into the gases rising from the pot to scavenge any unburned combustible gas there present. The rotor plate serves to compact the flames arising from the pot and ensures thorough mixture of the gases in their passage therethrough.

This burner is fundamentally of the type shown and described in the patent to Suchland No. 2,261,814, granted Nov. 4, 1941. Air flowing through the air holes 10c passes on through aligned holes 12a and sets up an aspirating effect which induces a flow of fuel gas into the chamber 17 between the pot side wall and the shell where such gas is admixed with the air flowing into and through the chamber with resultant jets of flame extending to a height proportionate to the oil supplied and vaporized.

In pilot fire operation, the burning jets will be at the lowest row of holes 10c and above the gas ring 13, but will be localized and compacted by the pilot ring 14. This arrangement has enabled me to cut down the oil required for the pilot fire to a very marked degree, a result which manufacturers of these vaporizing pot type burners have striven to obtain for a long time. This not only results in increased economy of operation but practically eliminates the incidental heating which is present in burners which burn more oil in maintaining pilot fires and the heating effect of which is undesirable in small homes or spaces.

In an actual burner embodying my invention, there are 104 primary air holes of drill size 40 and 124 secondary air holes of drill size 30 in the pot side wall while the shell has 104 air holes 11/32" in diameter. The diameter of the pot is 10 inches and that of the shell is 8⅝", the outer diameter of the gas ring being the same and the inner diameter or diameter of the central aperture is 4". The pilot ring is of 5⅝" diameter and the diameter of its central aperture is 1½". The legs support the pilot ring about 1⅛" above the gas ring. These dimensions are merely illustrative of an operative device and not intended to be restrictive of my invention.

While I have illustrated and described one embodiment of my invention, I do not wish to be restricted thereto, except as the appended claims may so restrict me.

What I claim is:

1. A burner of the class described comprising a pot having an imperforate bottom wall a side wall provided with primary air holes and means to supply liquid fuel to said pot, a shell inside the pot and spaced from and co-axial with said side wall, said shell being provided with air holes in alignment with said primary air holes in said side wall, a gas ring having a central aperture and extending inwardly from said shell below the air holes therein and above the bottom of said pot, and a pilot ring located above the aperture in said gas ring and in spaced relation thereto.

2. A burner of the class described comprising a pot having an imperforate bottom wall a side wall provided with primary air holes and means to supply liquid fuel to said pot, a shell inside the pot and spaced from and co-axial with said side wall, said shell being provided with air holes in alignment with said primary air holes in said side wall, a gas ring having a central aperture and extending inwardly from said shell below the air holes therein and above the bottom of said pot, a pilot ring located above the aperture in said gas ring and in spaced relation thereto, and means to support said pilot ring in operative position.

3. A burner of the class described comprising a pot having an imperforate bottom wall a side wall provided with primary air holes and means to supply liquid fuel to said pot, a shell inside the pot and spaced from and co-axial with said side wall, said shell being provided with air holes in alignment with said primary air holes in said side wall, a gas ring having a central aperture and extending inwardly from said shell below the air holes therein and above the bottom of said pot, a pilot ring located above the aperture in said gas ring and in spaced relation thereto, and means to support said pilot ring in operative position, said means comprising legs extending to and resting upon said gas ring.

4. A burner of the class described comprising a pot having an imperforate bottom wall a side wall provided with primary air holes and means to supply liquid fuel to said pot, a shell inside the pot and spaced from and co-axial with said side wall, said shell being provided with air holes in alignment with said primary air holes in said side wall, a gas ring having a central aperture and extending inwardly from said shell below the air holes therein and above the bottom of said pot, a pilot ring located above the aperture in said gas ring and in spaced relation thereto and means to support said pilot ring in operative position, said means comprising legs extending to and resting upon said gas ring, said legs being notched to project partially through said aperture in said gas ring.

5. A burner of the class described comprising a pot having an imperforate bottom wall a side wall provided with primary air holes and means to supply liquid fuel to said pot, a shell inside the pot and spaced from and co-axial with said side wall, said shell being provided with air holes in alignment with said primary air holes in said side wall, a gas ring having a central aperture and extending inwardly from said shell below the air holes therein and above the bottom of said pot, and a pilot ring located above the aperture in said gas ring and in spaced relation thereto, said pilot ring having a central opening aligned with the aperture of said gas ring.

6. A burner comprising a pot having a bottom providing a vaporizing chamber for liquid fuel and having a side wall provided with primary air holes, means to supply liquid fuel to said pot, a shell within the pot having side walls spaced from the side walls of the pot to provide a mixing chamber therebetween and provided with air holes in alignment with the primary air holes of the pot, said shell terminating short of the bottom of said pot, said mixing chamber being closed at the top, a gas ring at the bottom of the shell spaced above the bottom of the pot for deflecting gases from the vaporizing chamber into said mixing chamber for admixture with air entering the holes of said pot side wall whereby the admixture passes through the holes of said shell for combustion within the shell during operation of the burner, and a pilot ring within said shell at an elevation above said gas ring and above some of the openings of said shell for cooperation with the latter and with said gas ring for maintaining between said rings a pilot flame within the shell.

BOYD F. CASTLE.